(12) United States Patent
Tonicello

(10) Patent No.: US 7,629,710 B2
(45) Date of Patent: Dec. 8, 2009

(54) CONTROL DEVICE FOR POWER SUPPLY BUS VOLTAGE REGULATION

(75) Inventor: Ferdinando Tonicello, Leiden (NL)

(73) Assignee: Agence Spatiale Europeenne, Paris (FR)

( * ) Notice: Subject to any disclaimer, the term of this patent is extended or adjusted under 35 U.S.C. 154(b) by 74 days.

(21) Appl. No.: 11/984,395

(22) Filed: Nov. 16, 2007

(65) Prior Publication Data

US 2008/0129119 A1 Jun. 5, 2008

(30) Foreign Application Priority Data

Nov. 17, 2006 (FR) .................................. 06 10059

(51) Int. Cl.
*H02J 1/00* (2006.01)
*H02J 3/00* (2006.01)

(52) U.S. Cl. ........................................ 307/86

(58) Field of Classification Search ................ 307/46, 307/56, 66, 84, 86; 320/101, 107; 323/234
See application file for complete search history.

(56) References Cited

U.S. PATENT DOCUMENTS 6,181,115 B1 * 1/2001 Perol et al. ................... 323/234

6,744,236 B2 * 6/2004 Capel et al. .................. 320/101

FOREIGN PATENT DOCUMENTS

| FR | 2785103 | 4/2000 |
|----|---------|--------|
| GB | 2090084 | 6/1982 |

OTHER PUBLICATIONS

D. O'Sullivan, et al., "The Sequential Switching Shunt Regulator $S^3R$", Proceedings of the Third ESTEC Spacecraft Power Conditioning Seminar held at Noordwijk, The Netherlands, Sep. 21-23, 1977, pp. 123-131.

* cited by examiner

*Primary Examiner*—Albert W Paladini
*Assistant Examiner*—Carlos Amaya
(74) *Attorney, Agent, or Firm*—Clark & Brody

(57) ABSTRACT

A control device for voltage regulation of a power supply bus, including a first switch adapted, when in a closed position, to connect an electrical energy generator to an energy storage device, and a second switch adapted, when in a closed position, to short-circuit said generator, said generator being connected to said power supply bus if said first and second switches are in an open position, which control device further including first means for generating a signal for controlling said first switch and second means for generating a signal for controlling said first switch, said first and second means for generating a signal for controlling said first and second switches, respectively, being separate means operating independently of each other.

14 Claims, 5 Drawing Sheets

CONTROL DEVICE FOR POWER SUPPLY BUS VOLTAGE REGULATION

The invention relates to a control device for regulating the voltage on a power supply bus and to a module for generating electrical energy for a power supply bus including such a device.

BACKGROUND OF THE INVENTION

A device and a module according to the invention are adapted in particular to supply satellites with electrical energy generated by a solar generator.

The electrical power supply network of a satellite generally includes a main power supply bus to which are connected a solar generator that consists of a plurality of individual generators, an electrical energy storage device that includes one or more batteries, and the equipment to be supplied with power. The solar generator must at the same time supply power to the main bus and charge the energy storage device, which device takes over from the generator during periods of eclipse and assists it to manage peaks in consumption of energy by the equipment. Moreover, it is also necessary to provide a mechanism for dissipating excess energy that may be produced by the solar generator, in particular under conditions of strong illumination and low consumption by the equipment.

The voltage of the main bus is conventionally regulated by selectively connecting the individual solar generators to said main bus or by short-circuiting them. If the voltage level on the main bus tends to increase, one of the individual generators assigned to supplying it with power is short-circuited; conversely, if the voltage level on the bus tends to decrease, one of the short-circuited generators is connected to it. A dedicated device controls charging of the batteries via the main bus and discharging of the batteries if the energy produced by all the solar generators proves to be insufficient to maintain a nominal voltage level on said main bus. This principle, known as an $S^3R$ (sequential switching shunt regulator) architecture, is described in the document BE 853124 and in the paper by D. O'Sullivan and A. Weinberg entitled "The Sequential Switching Shunt Regulator $S^3R$", Proceedings of the Third ESTEC Spacecraft Power Conditioning Seminar, 21-23 Sep. 1977 (ESA SP 126, pages 123-131).

The document FR 2 785 103 discloses a significant improvement to the $S^3R$ architecture in which a three-state control device selectively connects each solar generator to a power supply bus or to an electrical energy storage device, or short-circuits it. In this way, the three-state control device regulates the voltage on the main bus and at the same time charges the batteries, eliminating the requirement for a separate charging regulator. The resulting significant simplification makes the power supply system more reliable and increases its energy efficiency. This improved architecture is known in the technical literature as the $S^4R$ (sequential and serial switching shunt regulator) architecture.

The document FR 2 828 962 describes a complete voltage regulation system for a main power supply bus including a plurality of $S^4R$ modules.

FIG. 1 shows one example of an $S^4R$ control device including a control unit L that controls two switches I1 and I2 as a function of a first signal NTBA indicating the voltage level of said power supply bus and a second signal NTCB indicating a battery charging voltage level. A simple inspection of the circuit shows that the generator G supplies the main bus BUS with electrical energy when the two switches are open, charges the battery BATT when the switch I2 is open and the switch I1 is closed, and is short-circuited if the switch I2 is closed, regardless of the state of the switch I1.

A drawback of the FIG. 1 control device is that failure of the control unit L, of the means for generating the second signal NTCB, or of the switch I1 can cause the said switch to stick in the closed position, which is liable to overcharge the batteries and therefore damage them. This problem is particularly acute if the maximum battery charging voltage is lower than the nominal voltage of the main bus.

This problem is highlighted by the document FR 2 785 103 itself, which proposes to solve it by forcing closure of the switch I2 if the switch I1 is closed when the second signal NTCB indicates a relatively high level of charge of the batteries, which should have caused it to open.

This solution is not entirely satisfactory, as it is effective only against a failure occurring at the level of the switch I1 itself, and is without effect in the event of a malfunction of the control unit L. In fact, in the event of failure of the control unit, it would not be possible to force the closure of I2 and therefore to implement the protection. Similarly, failure in the means for generating the second signal NTCB could render the proposed protection mechanism inoperative.

It follows that an isolated fault (i.e. one concerning only one element) occurring in only one of the numerous control devices included in a complete voltage regulation system for a main power supply bus is liable to lead to irreparable deterioration of an essential component of said system, namely the electrical energy storage device.

The document FR 2 828 962 does not propose any solution to this problem. To the contrary, it gives detailed electrical schematics of $S^4R$ modules that do not even implement the partial protection mechanism of the document FR 2 785 103.

OBJECTS AND SUMMARY OF THE INVENTION

An object of the invention is to provide a total or partial solution to this drawback of the prior art.

Another object of the invention is to provide such a solution without significantly increasing the complexity of the main power supply bus voltage regulation system.

In accordance with the invention, the above objects are achieved by a control device for power supply bus voltage regulation, including a first switch adapted, when in a closed position, to connect an electrical energy generator to an energy storage device, and a second switch adapted, when in a closed position, to short-circuit said generator, said generator being connected to said power supply bus when said first and said second switches are in an open position, the control device further including a control unit for generating a signal for controlling said first switch and a signal for controlling said second switch, which control device being wherein the control unit includes first means for generating said signal for controlling said first switch as a function of a first signal indicating a voltage level of said power supply bus and a second signal indicating a charging voltage level of said energy storage device, said first means being adapted to generate a control signal for closing said first switch if said first signal indicates a voltage level of said power supply bus greater than a first reference level and said second signal indicates a charging voltage level of said energy storage device less than a second reference level, and to generate a control signal for opening said first switch in all other circumstances, and second means, separate from and independent of said first means, for generating said signal for controlling said second switch as a function of said first signal indicating a voltage level of said power supply bus, said second signal indicating a charging voltage level of said energy storage device, and a third signal indicating a closed or open state of said first switch, said second means being adapted to generate a control signal for closing said second switch if said second signal indicates a charging voltage level of said energy storage device greater than said second reference level and said first signal indicates a voltage level of said power supply bus greater than said first reference level or, independently of the value of said first signal, said third signal indicates that said first switch is closed, and to generate a control signal for opening said second switch in all other circumstances.

In a control device according to the document FR 2 828 962, the control unit L receives two input signals respectively indicating a voltage level on the main bus and a battery charging voltage level and produces at its outputs respective control signals for the switches I1 and I2. Each of the two output signals depends on the two input signals, which are therefore "crossed", so to speak, in the control unit. It follows that an isolated fault occurring in the control unit L would very probably affect both output signals and would therefore disrupt the control of the two switches, which would prevent the implementation of protection against overcharging of the batteries conforming to the principle described in the above document.

In contrast, in a control device according to the invention, an isolated fault can affect only one of the two switch control signals. For example, if the isolated fault causes the first switch to stick in its closed position, the device remains capable of preventing any overcharging of the electrical energy storage device by forcing closure of the second switch. If, in contrast, the isolated fault causes the second switch to stick in its open position, the first switch remains capable of opening in turn when said energy storage device is sufficiently charged. The other possible failure modes (first switch stuck open or second switch stuck closed) cannot cause overcharging of the batteries, or more generally damage the main power supply bus voltage regulation system; these failure modes merely render one of the numerous individual solar generators of the system partially or totally inoperative. A failure mode in which the first switch is stuck open and the second switch is stuck closed, which would cause overcharging of the battery, can never occur as a consequence of an isolated failure.

According to particular embodiments of the invention:

Said second means for generating a signal for controlling said second switch can include a unit for detecting failure of charging of the energy storage device, receiving at a first input said second signal indicating a charging voltage level of said energy storage device and at a second input said third signal indicating a closed or open state of said first switch, said detection unit being adapted to generate at its output a signal indicating a failure condition if said third signal indicates that said first switch is closed whereas said second signal indicates a charging voltage level of said energy storage device greater than said second reference level.

Said unit for detecting failure of charging of the energy storage device can be adapted to maintain at its output a signal indicating a failure condition until said second signal at its first input changes value, then indicating a charging voltage level of said energy storage device less than said second reference level.

Said unit for detecting failure of charging of the energy storage device can instead be adapted to maintain at its output a signal indicating a failure condition for a time period before it is reinitialized, and early reinitialization can be caused by the transition of said second signal at its first input to a value indicating a charging voltage level of said energy storage device less than said second reference level.

Said second means for generating a signal for controlling said second switch can further include a control unit having a first input connected to the output of said failure detection unit, a second input for said first signal indicating a voltage level of said power supply bus, and a third input for said second signal indicating a charging voltage level of said energy storage device, said control unit being adapted:

to generate a control signal for closing said second switch if the signal at its third input indicates a charging voltage level of said energy storage device greater than said second reference level, and vice-versa;

to generate a control signal for opening said second switch if the signal at its second input indicates a voltage level of said power supply bus less than said first reference level; and to generate a control signal for closing said second switch if the signal at its first input indicates a condition of failure of the charging of the energy storage device;

subject to the condition that in the event of conflict the first input takes priority over the second input and the third input and the second input takes priority over the third input.

Said control device can further include a first comparator circuit including:

a first input for a signal indicating a difference between the voltage level of said power supply bus and a first nominal voltage level;

a second input for a first reference voltage level;

means for comparing the signals at said first and second inputs and for generating, as a function of the result of that comparison, said first signal indicating a voltage level of said power supply bus; and an output for said first signal indicating a voltage level of said power supply bus.

Said first comparator circuit can be a hysteresis comparator circuit.

Said first comparator circuit can be adapted to produce an output signal at a "high" level or at a "low" level, to the exclusion of any intermediate level.

Said control device can further include a second comparator circuit including:

a first input for a signal indicating a difference between the charging voltage level of said energy storage device and a second nominal voltage level;

a second input for a second reference voltage level;

means for comparing the signals at said first and second inputs and for generating, as a function of the result of that comparison, said second signal indicating a charging voltage level of said energy storage device; and an output for said second signal (B) indicating a charging voltage level of said energy storage device.

Said second comparator circuit can be a hysteresis comparator circuit.

Said second comparator circuit can be adapted to produce an output signal at a "high" level or a "low" level, to the exclusion of any intermediate level.

Said second comparator circuit advantageously has internal redundancies guaranteeing that in event of failure of only one of its elements said second comparator circuit continues to function normally or remains stuck in a state in which the signal at its output indicates a charging voltage level of said energy storage device greater than said second reference level.

The control device can instead further include a third comparator circuit including:

a first input for said signal indicating a difference between the charging voltage level of said energy storage device and a second nominal voltage level;

a second input for said second reference voltage level;

means for comparing the signals at said first and second inputs and for generating, as a function of the result of that comparison, a replica of said second signal indicating a charging voltage level of said energy storage device; and an output for said replica of said second signal indicating a charging voltage level of said energy storage device;

said replica of said second signal being supplied to the first input of said unit for detecting failure of charging of the energy storage device. Under such circumstances, it is not necessary for the second and third comparator circuits to include the aforementioned internal redundancies.

The invention also consists in an electrical energy generation module for a power supply bus, including an electrical energy generator and a control device as described above for selectively connecting said electrical energy generator to said power supply bus or to an energy storage device or short-circuiting it.

BRIEF DESCRIPTION OF THE DRAWINGS

Other features, details and advantages of the invention emerge on reading the description given with reference to the appended drawings, provided by way of example and in which.

MORE DETAILED DESCRIPTION

Figure 1:
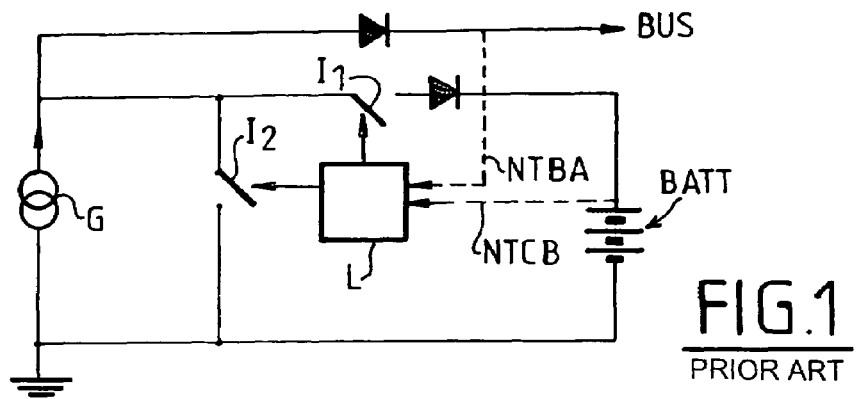
FIG. 1 is a bloc diagram of a prior art control device.
Figure 2:
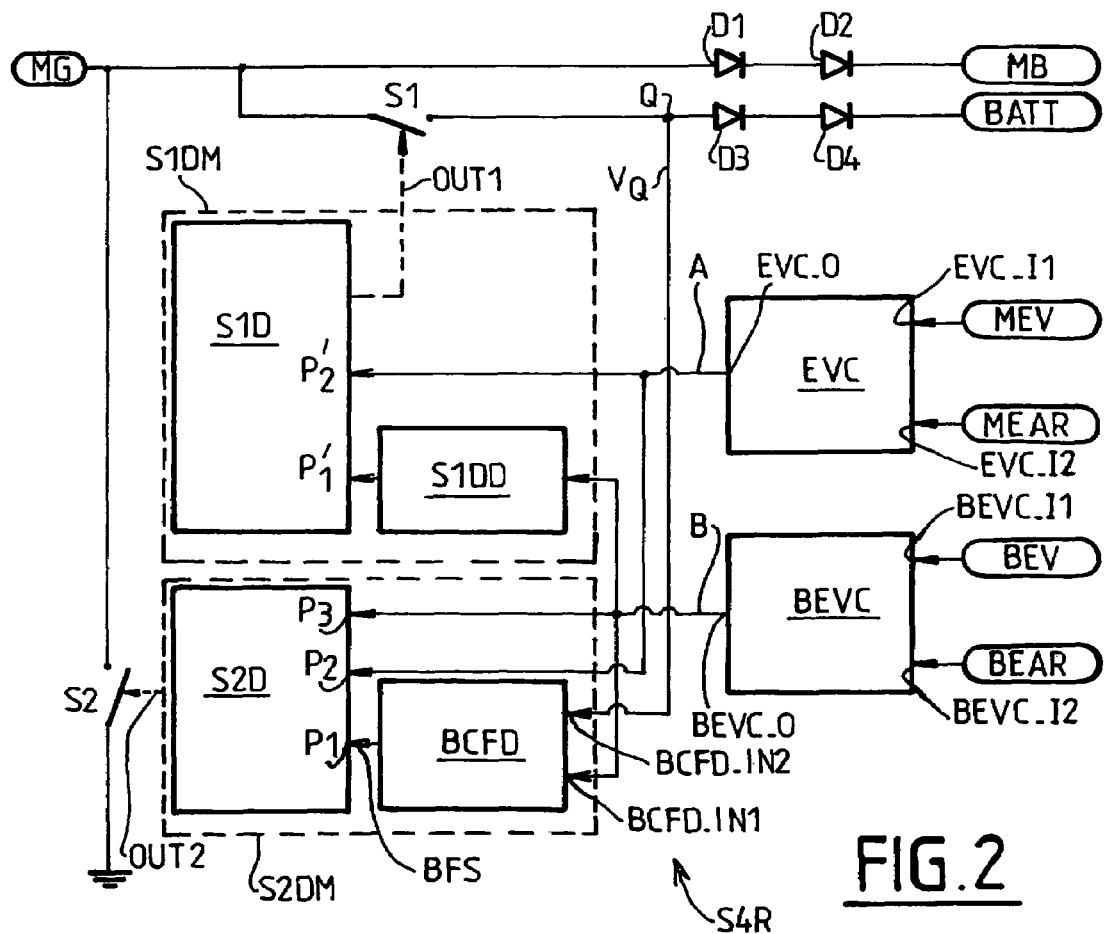
FIG. 2 is a bloc diagram of one embodiment of a control circuit according to the invention.

As shown in FIG. 2, an $S^4R$ control device according to the invention receives as input the current generated by a generator MG, typically a solar generator such as an array of photocells, and directs that current to a main power supply bus MB, an energy storage device BATT, typically a battery or a set of batteries, or to ground. When grounded, the generator MG is short-circuited. To be more precise, inspection of the FIG. 2 circuit shows that when the switch S2 is closed, the generator MG is short-circuited regardless of the state of the switch S1. If S2 is open and S1 closed, the current generated by the generator MG is directed to the energy storage device BATT, which is at a voltage generally lower than that of the bus MB, while if both switches S1, S2 are open the current is fed to the bus MB. In a manner known in the art, diodes D1, D2, D3, and D4 prevent electric current flowing from the bus or the energy storage device to the generator MG or from the bus to the energy storage device.

The switches S1 and S2, which generally take the physical form of power MOSFETs, are opened and closed by first and second control signal generation means S1DM and S2DM, respectively.

The first control signal generation means S1DM receive as input a first signal A indicating the voltage level of the main power supply bus MB and a second signal B indicating a charging voltage level of the energy storage device BATT, and produce at their output a signal OUT1 that controls the opening or closing of the first switch S1.

The second control signal generation means S2DM receive as input said first signal A indicating the voltage level of the main power supply bus MB, said second signal B indicating a charging voltage level of the energy storage device BATT, and a third signal $V_Q$ indicating the closed or open state of the first switch S1, and produces at its output a signal OUT1 that controls opening or closing of the second switch S2.

The first signal A and the second signal B are generated by a first comparator circuit EVC and a second comparator circuit BEVC, respectively.

The first comparator circuit EVC receives at its first input EVC_I1 a signal MEV indicating a difference between the voltage $V_{MB}$ on the power supply bus and its nominal value $V_{MB}^N$ and at its second input EVC_I2 a first reference voltage level MEAR. The signal A at its output EVC_O takes a "high" or "low" value, to the exclusion of any intermediate value, as a function of the result of a comparison with hysteresis of the input signals MEV and MEAR. For example, if A is initially in the "low" state while MEV<MEAR, it goes to the "high" state only if MEV exceeds MEAR+$\delta_H$; if MEV decreases again, A remains in the "high" state unless MEV falls below MEA−$\delta_L$, $\delta_H$+$\delta_L$ being the amplitude of the hysteresis. The principle of comparison with hysteresis and the means for implementing it are well known to the person skilled in the art.

The second comparator circuit BEVC receives at its first input BEVC_I1 a signal BEV indicating a difference between the charging voltage level of the energy storage device $V_{BATT}$ and its nominal value $V_{BATT}^N$, and at its second input BEVC_I2 a second reference voltage level BEAR. The signal B at its output BEVC_O takes a "high" or "low" value, to the exclusion of any intermediate value, as a function of the result of a comparison with hysteresis of the input signals BEV and BEAR.

The third signal $V_Q$ consists of the voltage value measured at the point Q situated between the switch S1 and the diodes D3, D4. That voltage is equal to the charging voltage of the energy storage device (less the potential difference across the diodes) if the diodes are forward biased, which occurs when the switch S1 is closed; when the switch S1 is open, $V_Q$ is at a low level.

Thus, in conclusion, the control device receives as input four analog signals MEV, MEAR, BEV, and BEAR, each indicating a voltage level or a voltage difference (the third signal $V_Q$ is generated internally). As function of the relative values of these signals, it selectively connects the generator MG associated with it to the bus MB or to the energy storage device BATT or short-circuits it.

Figure 3:
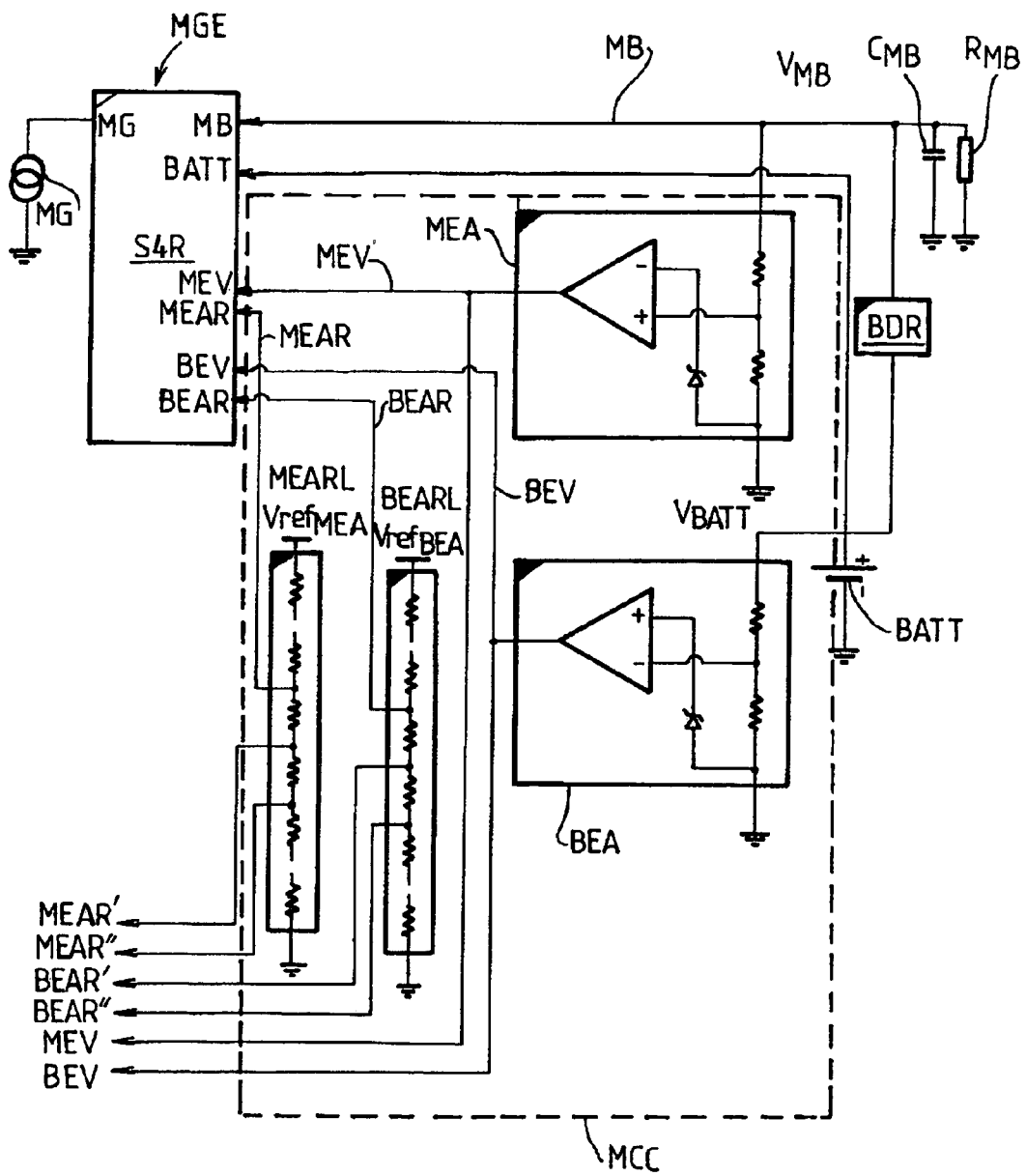
FIG. 3 is a bloc diagram of a complete voltage regulation system for a main power supply bus using a plurality of control devices of the type represented in FIG. 2.
Figure 4A:
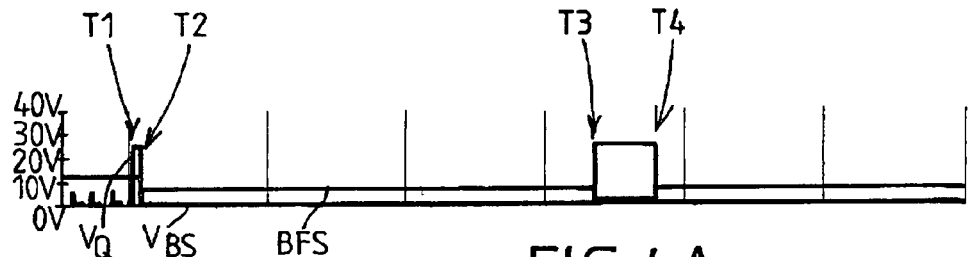
FIGS. 4A to 4E are graphs illustrating the operation of a first embodiment of a control device according to the invention.
Figure 4B:
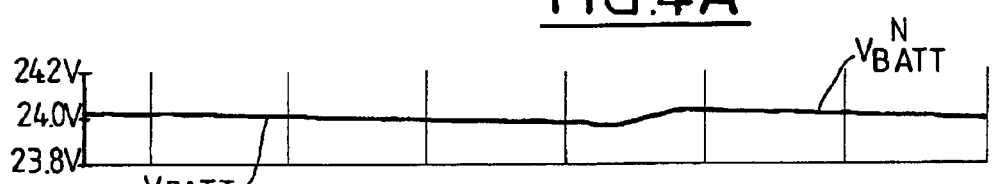
Figure 4C:
Figure 4D:
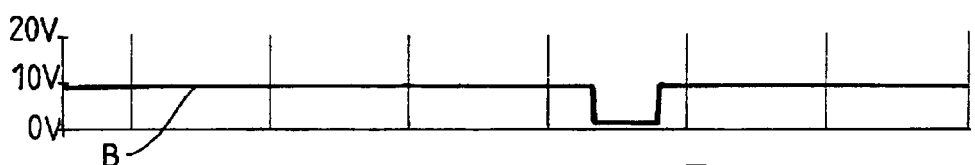
Figure 4E:
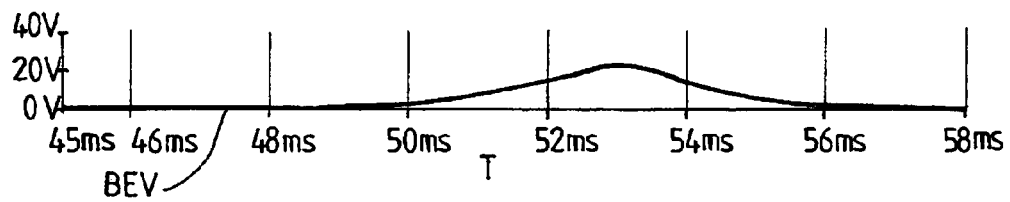
Figure 5A:
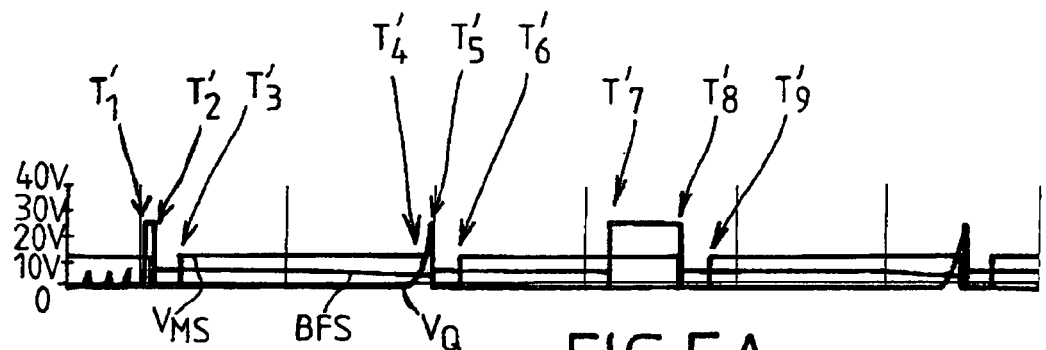
FIGS. 5A to 5E are graphs illustrating the operation of a second embodiment of a control device according to the invention.
Figure 5B:
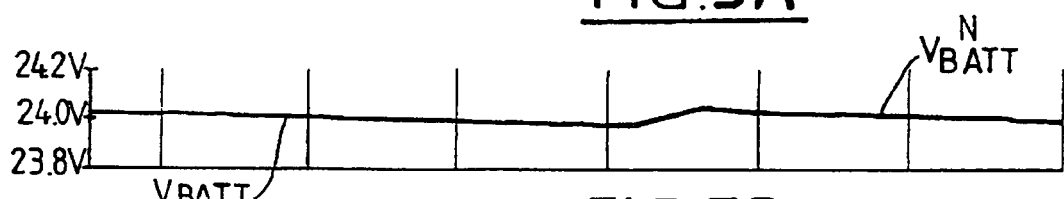
Figure 5C:
Figure 5D:
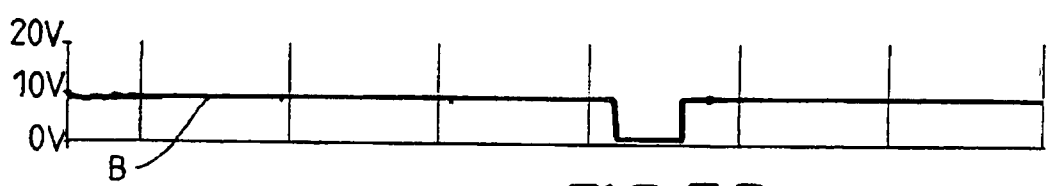
Figure 5E:
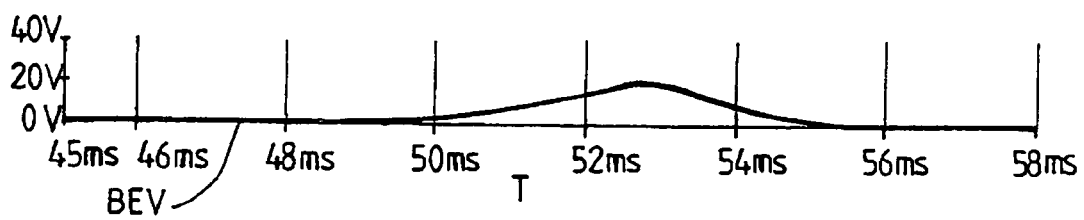

The internal structure and the operation of the elements S1DM and S2DM are described in detail after a general description, with reference to FIG. 3, of the architecture of a complete voltage regulation system for a main power supply bus. Such a system includes a plurality of electrical energy generation modules MGE, each comprising an individual solar generator MG and the associated $S^4R$ control device. Only one of these modules MGE is represented in FIG. 3. The various electrical energy generation modules are connected to the same main power supply bus MB, electrically modeled by a resistance $R_{MB}$ connected in parallel with a capacitor $C_{MB}$, and to the same electrical energy storage device. If the current supplied by the generation modules MGE proves insufficient to maintain the voltage on the bus MB sufficiently close to its nominal value, said bus is supplied with electrical energy by the energy storage device BATT via a discharge regulator BDR known in itself.

The FIG. 3 system must enable simultaneous regulation of the voltage on the main power supply bus MB and the charging current of the electrical device BATT. To this end, if the power generated by the generators MG is sufficient to supply the bus MB and the energy storage device BATT is not completely charged:
- some of the generation modules MGE are assigned to supplying the bus MB, and the switches S1 and S2 of their respective S⁴R control devices are therefore open;
- some of the modules MGE are assigned to charging the energy storage device BATT, their respective S⁴R control devices therefore having the switch S1 closed and the switch S2 open;
- a module MGE is assigned to fine regulation by pulse width modulation of the voltage level on said bus; and
- a module MGE is assigned to fine regulation by pulse width modulation of the charging voltage of the energy storage device BATT; the S⁴R control device of this module oscillates between a state in which it connects its generator MG to the energy storage device BATT and a state in which it short-circuits the generator;
- where appropriate, some of the modules MGE have their respective generator MG short-circuited to dissipate excess power generated.

The module MGE assigned to fine regulation of the voltage level on the main power supply bus MB oscillates between a first state in which it connects the generator MG to said bus and a second state in which it connects said generator to the battery BATT if BEAR<BEV and short-circuits it otherwise.

In contrast, if the energy storage device BATT is fully charged, then all the modules are either connected to the bus MB or short-circuited, with a module oscillating between these two states to effect the voltage regulation.

If the consumption from the bus exceeds the power that can be supplied by the generators MG (for example in the event of an eclipse), all the generators are connected to the bus and the energy storage device BATT supplies the missing power, being discharged via the regulator BDR.

The states of the various modules MGE are not determined in a centralized manner: a central control module MCC generates the difference signals MEV and BEV, which are common to all the modules, and the reference signals MEAR and BEAR, which are specific to each module (in FIG. 3, MEAR/BEAR, MEAR'/BEAR', and MEAR"/BEAR" are the reference signals for three modules MGE of which only one is represented). The S⁴R control device of each module MGE then determines its state autonomously as a function of the signals at its inputs.

In an advantageous embodiment of the invention, the modules MGE form an ordered series having increasing reference signals MEAR and decreasing reference signals BEAR, i.e. if MEAR<MEAR'<MEAR", then BEAR>BEAR'>BEAR". This enables the regulation system to function in the manner described above.

The central control module MCC includes two error amplifiers MEA and BEA that generate the difference signals MEV and BEV, respectively, and two resistor ladder voltage dividers MEARL and BEARL that generate the reference signals MEAR and BEAR, respectively. To guarantee reliable operation of the system it is appropriate for the elements of the central control module to be redundant, for example by providing majority vote redundancy. This does not significantly increase the complexity of the system as a whole.

FIG. 3 shows that the value of the difference signal MEV is directly proportional to the voltage $V_{MB}$ on the bus MB; in contrast, the value of the signal BEV is inversely proportional to the voltage $V_{BATT}$ of the energy storage device BATT. In other words, a high value of the signal MEV indicates a relatively high voltage level on the bus MB, whereas a high value of the signal BEV indicates a relatively low charging voltage level of the energy storage device BATT. The first comparator circuit EVC in each control device generates a "high" signal A if MEV≧MEAR, and vice-versa, whereas the second comparator circuit BEVC generates a "high" signal B if BEV≦BEAR, and vice-versa. In other words, a high level of the signal A/B indicates a relatively high voltage level on the bus MB/of the energy storage device BATT, respectively.

The control logic described above is partially arbitrary, and different sign conventions could have been chosen. However, it is necessary in any event to ensure that the system can behave correctly on start-up, when the voltage $V_{MB}$ on the main bus is zero. For example, it is practical to supply the error amplifier MEA with power from said main bus MB; as a consequence of this, on start-up the signal MEV generated by this amplifier is necessarily low. This being so, it is necessary for a low value of the signal MEV to lead to opening of the switches S1 and S2, so that the current from the generator MG is directed to the bus.

Returning to the FIG. 2 diagram, it can be seen that the first control signal generation means S1DM include:
- a device for generating a signal S1DD for deactivating the first switch, receiving as input the signal B and generating at its output a signal for deactivating the first switch; and
- a control unit S1D having two inputs P'1 and P'2 receiving the output signal of the device S1DD and the signal A, respectively, and an output for a signal OUT1 controlling the first switch S1.

The device S1DD for generating a signal for deactivating the first switch generates a signal for deactivating (i.e. opening) the switch S1 if the signal B at its input is high.

The control unit S1D operates as follows: a high (respectively low) value of the signal A at the input P'2 of the unit closes (respectively opens) the switch S1, but the presence of a deactivation signal at the input P'1 forces S1 open whatever the value of A (the input P'1 takes priority over the input P'2). From a physical point of view, this means that when the charging voltage level of the energy storage unit BATT is sufficiently high (B high), S1 is necessarily open to prevent overcharging; otherwise (B low), S1 is closed if the voltage on the bus MB is sufficiently high (A high) and open otherwise: in fact, if the energy storage device and the bus need to be supplied with power at the same time, the bus takes priority.

Clearly the device for generating a signal for deactivating the first switch is not essential, and the control unit S1D could equally well receive the signal B directly at its input P'1.

The second control signal generation means S2DM include:
- a unit BCFD for detecting failure of charging of the energy storage device receiving at a first input BCFD_IN1 the signal B and at a second input BCFD_IN2 the signal $V_Q$ and generating at its output a signal BFS indicating a failure condition; and
- a control unit S2D having three inputs P1, P2, and P3 receiving said signal BFS indicating a failure condition, the signal A, and the signal B, respectively, and an output for a signal OUT2 for controlling the second switch S2.

The unit BCFD for detecting failure of charging of the energy storage device generates the signal BFS indicating a failure condition if it detects the charging voltage of the energy storage device BATT at the point Q (signal $V_Q$) when the signal B is in its high state. In view of the above description, this condition is abnormal, because a high level of the signal B should normally open the switch S1, but the high value of the potential $V_Q$ at the point Q indicates that this switch is in fact closed. This anomaly can be caused by failure of the switch itself, which is short-circuited, or failure of the control signal generation means S1DM.

The operation of the control unit S2D is as follows:

a high (low) value of the signal B at the input P3 of the unit closes (respectively opens) the switch S2;

a low value of the signal A at the input P2 of the unit opens the switch S2, regardless of the value of the signal at the input P3 (the input P2 takes priority over the input P3); and the signal BFS at the input P1 of the unit closes the switch S2 regardless of the value of the signals at the input P2 and P3 (P1 takes priority over P2 and P3).

From a physical point of view, this indicates that the switch S2 is closed (and therefore that the generator MG is short-circuited) in only two circumstances:

if the signals A and B are both at a high level, indicating that neither the bus MB nor the energy storage device BATT needs to be supplied with power by said generator; or if the switch S1 is closed when the signal B is at a high level, so as not to overcharge the energy storage device BATT.

Note that failure of S1 or S1D prevents use of the generator MG for supplying power to the bus MB but enables it to be continued to be used for charging the energy storage device BATT. The occurrence of an isolated fault therefore does not take the module affected completely out of service.

For reasons that are explained below, it is important for the second comparator circuit BEVC to be designed so that an isolated fault cannot cause its output B to stick at the low level. This can be achieved simply by duplicating the circuit and connecting the two individual comparators constituting it to the same output via diodes. In this way, if the output of one of said individual comparators is stuck at its low level, the other individual comparator ensures normal operation of the circuit BEVC as a whole, while if the output of one of the individual comparators is stuck at its high level, the output B of the circuit BEVC is also stuck at its high level.

This redundancy of the element BEVC only slightly increases the complexity of each module MGE. The other components (EVC, S1DD, S1D, BCFD, S2D, S1, and S2) generally do not need to be completely duplicated. It is nevertheless opportune for the elements EVC, S1D, S1DD, and S2D to have internal structures that guarantee, even in the event of an isolated fault, that their output can assume only one of the two permitted discrete values, to the exclusion of any intermediate value. This is achieved, when designing these elements, by taking into account all failure modes that have a non-negligible probability of occurring, which is standard practice in the art. In some circumstances, appropriate internal redundancies can be introduced to obtain the required behavior in the event of an isolated fault.

Consider now what happens in the event of an isolated fault in one of the elements of the $S^4R$ control device. It should be noted that in no circumstances is there any risk of overcharging, and therefore damaging, the electrical energy storage device BATT.

First case: fault in EVC, output A stuck at its low level. In this case, the switch S1 is always open, and the generator MG cannot charge the battery; a fortiori, there is no risk of it overcharging it. However, MG can still contribute to regulating the voltage on the bus MB via the switch S2.

Second case: fault in EVC, output A stuck at its high level. In this case, the open or closed state of S1 depends entirely on the signal B, and therefore on the level of charge of the energy storage device BATT. There is therefore no danger of overloading the storage device. However, the generator MG can no longer contribute effectively to regulation of the voltage on the bus MB.

Third case: fault in BEVC, output B stuck at its high level (the opposite situation is not possible for the reasons given above). In this case, the switch S1 is permanently open, which prevents the generator MG from contributing to the charging of the energy storage device BATT, but not from contributing to regulation of the voltage on the bus MB.

Fourth case: fault in S1DM or in the switch S1 itself, causing the switch to stick open. Everything is as in the first case discussed above.

Fifth case: fault in S1DM or in the switch S1 itself, the switch being stuck in its closed position. In this case, overcharging of the energy storage device is prevented by the unit BCFD for detecting failure of charging of the energy storage device, which forces the switch S2 closed if B assumes its high value. The generator MG can therefore continue to contribute to charging the energy storage device BATT, but can no longer supply power to the bus MB.

Sixth case: fault in BCFD, which can no longer generate the signal BFS. If this fault is isolated, and S1DM and S1 therefore operate normally, it has no consequence in respect of the operation of the $S^4R$ device.

Seventh case: fault in BCFD, S2D, or S2, the switch being stuck closed. In this case, the generator MG is permanently short-circuited. Apart from failure of the generator MG itself, this is the only eventuality in which an isolated fault takes the module MGE completely out of service. However, the loss of a single module has no serious consequences for the operation of the regulation system as a whole, this eventuality generally being taken into account when deciding on the ratings of the system.

Eighth case: fault in BCFD, S2D, or S2, the switch being stuck open. The generator is therefore connected either to the bus MB or to the energy storage device BATT, but the device S1DD for generating a signal for deactivating the first switch prevents overcharging of the storage device, by causing S1 to open when the signal B goes to its high level. In this case, the bus is supplied with power continuously by at least one generator, corresponding precisely to the faulty module MGE. This generally has no serious consequences because, if the minimum consumption of the equipment to be supplied with power is less than the power of an individual generator, it suffices to add to that equipment a dissipation resistor connected to the bus by a switch controlled by the central control module MCC.

The input signals of the $S^4R$ control device are "reliable" because the central control module MCC has redundancies, for example majority vote redundancies, sufficient to ensure it operates normally even in the case of an isolated fault.

Consequently, in no case is an isolated fault occurring in any element of the voltage regulation system for a main power supply bus liable to lead to irreparable deterioration of an essential component of said system, and in particular the electrical energy storage device BATT. Moreover, this result is obtained without it being necessary to provide redundancies for all the elements of the system: only the central control module MCC is completely redundant, whereas the S$^4$R control devices have a limited degree of internal redundancy.

In FIG. 3, the blocks that are entirely redundant have a black triangle in the top left-hand corner, whereas those that are only partially redundant have a white triangle in their top left-hand corner.

Figure 6:
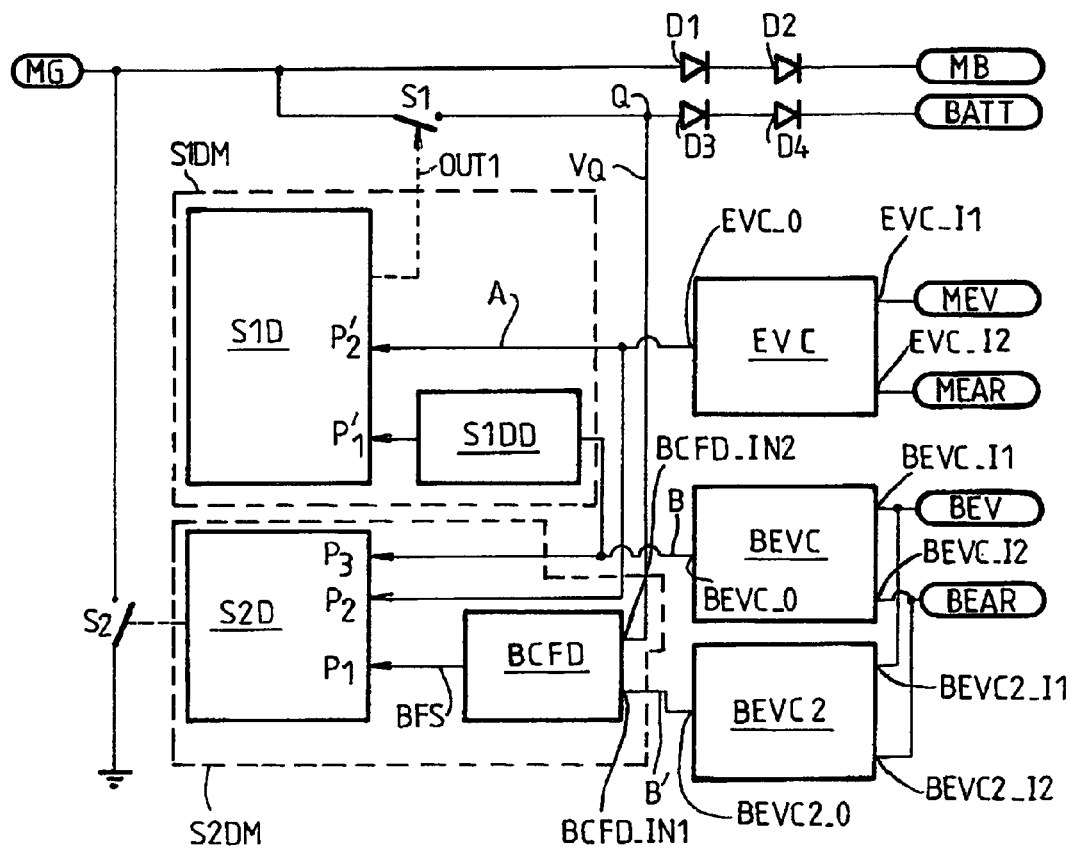
FIG. 6 is a bloc diagram of an alternative embodiment of a control device according to the invention.

Alternatively, as shown in FIG. 6, it is possible also to provide a third comparator circuit BEVC2. Just like the second comparator circuit BEVC, the circuit BEVC2 receives at its first input BEVC2_I1 the signal BEV and at its second input BEVC2_I2 the signal BEAR, and supplies at its output BEVC2_O a replica B' of the signal B. In this embodiment of the invention, the signal B generated by BEVC is supplied to the third input P3 of the control unit S2D, while its replica B' generated by BEVC2 is supplied to the first input BCFD_I1 of the unit BCFD. As long at the two comparator circuits BEVC and BEVC2 operate regularly, the signals B and B' that they generate take the same value at all times, and the device operates exactly as if a single comparator circuit connected both to the inputs of S2D and those of BCFD were present. In the event of an isolated fault, one of the two circuits can be subject to an operating anomaly, but the other continues to behave correctly: it is possible to verify that this is sufficient to prevent any risk of overcharging of the battery. Compared to the FIG. 2 embodiment, this variant simplifies the internal structure of the comparators BEVC, BEVC2, because it is no longer necessary to ensure that an isolated fault cannot cause the output B or B' to stick at the low level. It is only necessary for said output signals to take a defined value, high or low, even in the event of a fault.

It is immaterial whether the control means S1DM of the first switch receive as input the signal B generated by the second comparator circuit BEVC, as shown in FIG. 6, or the replica B' generated by the third comparator circuit BEVC2.

The operation of the unit BCFD for detecting failure of charging of the energy storage device merits more detailed consideration. In fact, in contrast to what the final paragraph of above-mentioned document FR 2785103 might suggest, the value of the signal at the output of this unit cannot depend only on the instantaneous values of the signals at its input. This can be made clear with an example: assume that at the time T both $V_Q$ and B are at their high level, which is a condition indicating a fault; in this case, the unit BCFD generates the output signal BFS that forces closure of the switch S2; when the switch S2 is closed, the point Q is grounded via a path of low resistance, and the signal $V_Q$ therefore takes a low value immediately. If this variation of $V_Q$ were relayed immediately to the output of BCFD, S2 would open again, and an uncontrolled cycle of oscillation would be established.

The invention proposes two alternative solutions to this problem.

In a first embodiment, the unit BCFD for detecting failure of the energy storage device operates in a bistable manner: it generates at its output the signal BFS indicating a failure condition if both B and $V_Q$ are at a high level, and maintains it until the signal B changes value, by effecting a transition to a low level. The transition of $V_Q$, which necessarily occurs when the switch S2 is closed, has no effect.

In a second embodiment, the unit BCFD for detecting failure of the energy storage device operates in a monostable manner: it generates at its output the signal BFS indicating a failure condition if both B and $V_Q$ are at a high level, and maintains it for a particular time period, after which it is reset.

The bistable operation of the unit BCFD for detecting failure of the energy storage device can be better understood in the light of FIGS. 4A to 4E which represent curves of the temporal evolution of the signals $V_Q$ (FIG. 4A), BFS (FIG. 4A), B (FIG. 4D), and BEV (FIG. 4E), together with the voltage $V_{BATT}$ (FIG. 4B) and the charging current $I_{BATT}$ (FIG. 4C) of the electrical energy storage device BATT. The signal VBA (FIG. 4A) indicates the state of a bistable device internal to the unit BCFD, on which the output signal BFS depends.

Initially (T=45 ms), the signal B is in its high state (10 V), and the switch S1 is therefore open and consequently $V_Q$=0 V and $I_{BATT}$=0 A. The charging voltage of the energy storage device BATT is slightly greater than 24 V and decreases slowly because said device self-discharges.

At time T1 (T=46 ms), the switch S1 is short-circuited and thereafter remains closed. The signal $V_Q$ undergoes a fast transition to a value close to $V_{BATT}$ and an electrical current $I_{BATT}$ begins to charge the energy storage device BATT.

At time T2, as B is still at its high value, the unit BCFD reacts: $V_{BS}$, initially high, goes to a low level and BFS takes a high value, indicating a failure condition. Following these transitions, the switch S2 is closed, which returns the voltage $V_Q$ and the current $I_{BATT}$ to zero. Despite the fact that $V_Q$ is again low, the unit BCFD maintains the signal BEV at its output (bistable operation).

In between times, the energy storage device continues to discharge slowly: the voltage $V_{BATT}$ decreases and the difference signal BEV increases. At time T3, BEV takes a value sufficiently high to trigger a transition of the signal B to its high state. This causes the unit BCFD to return to its initial state, with BFS=0 V, which leads to the switch S2 opening again.

The switch S2 being open, a current $I_{BATT}$ can charge the energy storage device, causing its charging voltage $V_{BATT}$ to increase and a correlated reduction in the value of the difference BEV. $V_Q$ returns to a high level, but this has no effect on the unit BCFD if B remains at its low level.

At time T4, the reduction of the value of the signal BEV below the predetermined threshold (BEAR−$\delta_L$) causes B to return to its high level. Once again, the unit BCFD causes closure of the switch S2.

The monostable operation of the unit BCFD for detecting failure of the energy storage device can be better understood in the light of FIGS. 5A to 5E which represent the curves of the temporal evolution of the signals $V_Q$ (FIG. 5A), BFS (FIG. 5A), B (FIG. 5D), and BEV (FIG. 5E), together with the voltage $V_{BATT}$ (FIG. 5B) and the current $I_{BATT}$ (FIG. 5C) charging the electrical energy storage device BATT. The signal $V_{MS}$ (FIG. 5A) indicates the state of a monostable device internal to the unit BCFD, on which the output signal BFS depends. To be more precise, if the signal $V_{MS}$ effects a transition from its (stable) high level to its (metastable) low level, it causes the charging of a capacitor which is then discharged through a resistor; the signal BFS is proportional to the voltage across this capacitor: it is therefore a signal with continuous values.

As in the case of FIGS. 4A-4E, initially (T=45 ms) the signal B is in its high state (10 V), and the switch S1 is therefore open and consequently $V_Q$=0 V and $I_{BATT}$=0 A; the charging voltage of the energy storage device is slightly greater than 24 V and decreases slowly because said device self-discharges.

At the time T'1 (T=46 ms), the switch S1 is short-circuited, and thereafter remains closed. The signal $V_Q$ undergoes a fast transition to a value close to $V_{BATT}$ and an electrical current $I_{BATT}$ begins to charge the energy storage device.

As B is still at its high value, the unit BCFD reacts at time T'2: $V_{MS}$, initially high, goes to a low level and remains there until time T'3. The signal BFS therefore undergoes a transition to a high level, and then begins to decrease slowly.

At time T'4 the MOSFET that physically constitutes the switch S2, and which was in its conducting state, enters its ohmic region following the reduction of the voltage BFS applied to its gate. Consequently, $V_Q$ begins to increase again, while the current $I_{BATT}$ remains negligible because of the presence of the diodes D3 and D4. Following the increase in $V_Q$, at time T'5 the signal $V_{MS}$ again undergoes a transition from its high level to its low level, returning BFS to the same high level as at time T'2. The switch S2 therefore returns to its conducting state. At time T'6, the signal $V_{MS}$ returns to its (high) stable state. The gradual opening of the switch S2 might be said to enable the device BCFD to "probe" $V_Q$ at regular intervals. The value of $V_Q$ in correspondence with which BCFD reacts by opening S2 again must be lower than the charging voltage. $V_{BATT}$ of the battery in order to prevent partial opening of the switch S2 causing overcharging of the battery.

In between times, the electrical energy storage device BATT discharges slowly, and $V_{BATT}$ therefore decreases slowly and the different signal BEV increases; at time T'7, BEV reaches a level sufficiently high to cause a transition of the signal B to its low level. In turn, this transition causes the switch S2 to open and reinitialization of the unit BCFD, i.e. return of the signal BFS to its low level. The battery therefore begins to charge via S2, and the signal BEV to decrease, although with a certain delay.

At time T'8, the decrease of the signal BEV above the threshold value BEAR−$\delta_L$ causes a transition of the signal B to its high level. The unit BCFD therefore causes BFS to return to a high level and closes the switch S2. At this time, the control cycle resumes at the point T'2.

The embodiment of the invention is beneficial because reinitialization of the unit BCFD can occur even with no variation of the signal B (see what happens between T'4 and T'6). For BCFD to be able to react to a failure of the switch S1 it is therefore not necessary for an overvoltage at the battery BATT to propagate through the whole of the control system, by way of the signals BEA, BEVC, and finally B. The use of a monostable operation unit BCFD is therefore particularly beneficial if the battery has a low capacity (and its charging voltage therefore varies rapidly), or if the control system is slow compared to the characteristic time of an overcharging episode.

What is claimed is:

1. A control device for power supply bus voltage regulation, including:
   a first switch adapted, when in a closed position, to connect an electrical energy generator to an energy storage device; and
   a second switch adapted, when in a closed position, to short-circuit said generator;
   said generator being connected to said power supply bus when said first and said second switches are in an open position, the control device further including a control unit for generating a signal for controlling said first switch and a signal for controlling said second switch, wherein the control unit includes:
   first means for generating said signal for controlling said first switch as a function of a first signal indicating a voltage level of said power supply bus and a second signal indicating a charging voltage level of said energy storage device, said first means being adapted to generate a control signal for closing said first switch if said first signal indicates a voltage level of said power supply bus greater than a first reference level and said second signal indicates a charging voltage level of said energy storage device less than a second reference level, and to generate a control signal for opening said first switch in all other circumstances; and
   second means, separate from and independent of said first means, for generating said signal for controlling said second switch as a function of said first signal indicating a voltage level of said power supply bus, said second signal indicating a charging voltage level of said energy storage device, and a third signal indicating a closed or open state of said first switch, said second means being adapted to generate a control signal for closing said second switch if said second signal indicates a charging voltage level of said energy storage device greater than said second reference level and:
   said first signal indicates a voltage level of said power supply bus greater than said first reference level; or
   independently of the value of said first signal, said third signal indicates that said first switch is closed; and
   to generate a control signal for opening said second switch in all other circumstances.

2. A control device according to claim 1, wherein said second means for generating a signal for controlling said second switch include a unit for detecting failure of charging of the energy storage device, receiving at a first input said second signal indicating a charging voltage level of said energy storage device and at a second input said third signal indicating a closed or open state of said first switch, said detection unit being adapted to generate at its output a signal indicating a failure condition if said third signal indicates that said first switch is closed whereas said second signal indicates a charging voltage level of said energy storage device greater than said second reference level.

3. A control device according to claim 2, wherein said unit for detecting failure of charging of the energy storage device is adapted to maintain at its output a signal indicating a failure condition until said second signal at its first input changes value, then indicating a charging voltage level of said energy storage device less than said second reference level.

4. A control device according to claim 2, wherein said unit for detecting failure of charging of the energy storage device is adapted to maintain at its output a signal indicating a failure condition for a time period before it is reinitialized, and wherein early reinitialization can be caused by the transition of said second signal at its first input to a value indicating a charging voltage level of said energy storage device less than said second reference level.

5. A control device according to claim 2, wherein said second means for generating a signal for controlling said second switch further include a control unit having a first input connected to the output of said failure detection unit, a second input for said first signal indicating a voltage level of said power supply bus, and a third input for said second signal indicating a charging voltage level of said energy storage device, said control unit being adapted:
   to generate a control signal for closing said second switch if the signal at its third input indicates a charging voltage level of said energy storage device greater than said second reference level, and vice-versa;
   to generate a control signal for opening said second switch if the signal at its second input indicates a voltage level of said power supply bus less than said first reference level; and to generate a control signal for closing said second switch if the signal at its first input indicates a condition of failure of the charging of the energy storage device;

subject to the condition that in the event of conflict the first input takes priority over the second input and the third input and the second input takes priority over the third input.

6. A control device according to claim 1, further including a first comparator circuit including:
- a first input for a signal indicating a difference between the voltage level of said power supply bus and a first nominal voltage level;
- a second input for a first reference voltage level;
- means for comparing the signals at said first and second inputs and for generating, as a function of the result of that comparison, said first signal indicating a voltage level of said power supply bus; and
- an output for said first signal indicating a voltage level of said power supply bus.

7. A control device according to claim 6, wherein said first comparator circuit is a hysteresis comparator circuit.

8. A control device according to claim 6, wherein said first comparator circuit is adapted to produce an output signal at a "high" level or at a "low" level, to the exclusion of any intermediate level.

9. A control device according to claim 1, further including a second comparator circuit including:
- a first input for a signal indicating a difference between the charging voltage level of said energy storage device and a second nominal voltage level;
- a second input for a second reference voltage level;
- means for comparing the signals present at said first and second inputs and for generating, as a function of the result of that comparison, said second signal indicating a charging voltage level of said energy storage device; and
- an output for said second signal indicating a charging voltage level of said energy storage device.

10. A control device according to claim 9, wherein said second comparator circuit is a hysteresis comparator circuit.

11. A control device according to claim 9, wherein said second comparator circuit is adapted to produce an output signal at a "high" level or a "low" level, to the exclusion of any intermediate level.

12. A control device according to claim 11, wherein said second comparator circuit has internal redundancies guaranteeing that in event of failure of only one of its elements said second comparator circuit continues to function normally or remains stuck in a state in which the signal at its output indicates a charging voltage level of said energy storage device greater than said second reference level.

13. A control device according to claim 9, wherein said second means for generating a signal for controlling said second switch include a unit for detecting failure of charging of the energy storage device, receiving at a first input said second signal indicating a charging voltage level of said energy storage device and at a second input said third signal indicating a closed or open state of said first switch, said detection unit being adapted to generate at its output a signal indicating a failure condition if said third signal indicates that said first switch is closed whereas said second signal indicates a charging voltage level of said energy storage device greater than said second reference level, and further comprising a third comparator circuit including:
- a first input for said signal indicating a difference between the charging voltage level of said energy storage device and a second nominal voltage level;
- a second input for said second reference voltage level;
- means for comparing the signals at said first and second inputs and for generating, as a function of the result of that comparison, a replica of said second signal indicating a charging voltage level of said energy storage device; and
- an output for said replica of said second signal indicating a charge voltage level of said energy storage device;
- said replica of said second signal being supplied to the first input of said second unit for detecting failure of charging of the energy storage device.

14. An electrical energy generation module for a power supply bus, including:
- an electrical energy generator; and
- a control device according to claim 1 for selectively connecting said electrical energy generator to said power supply bus or to an energy storage device, or short-circuiting it.

* * * * *